United States Patent
Behrens et al.

(10) Patent No.: US 6,615,208 B1
(45) Date of Patent: Sep. 2, 2003

(54) AUTOMATIC RECOMMENDATION OF PRODUCTS USING LATENT SEMANTIC INDEXING OF CONTENT

(75) Inventors: Clifford A. Behrens, Madison, NJ (US); Dennis E. Egan, Westfield, NJ (US); Yu-Yun Ho, Basking Ridge, NJ (US); Carol Lochbaum, Berkeley Heights, NJ (US); Mark Rosenstein, Morristown, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 201 days.

(21) Appl. No.: 09/653,917

(22) Filed: Sep. 1, 2000

(51) Int. Cl.[7] .............................................. G06F 17/30
(52) U.S. Cl. ......................................................... 707/5
(58) Field of Search ................................ 707/1, 4, 5, 6, 707/532; 345/810; 434/353; 704/1, 2, 10

(56) References Cited

U.S. PATENT DOCUMENTS

| | | | |
|---|---|---|---|
| 4,348,740 A | | 9/1982 | White .......................... 709/253 |
| 4,839,853 A | | 6/1989 | Deerwester et al. ........... 707/5 |
| 4,870,579 A | | 9/1989 | Hey .............................. 705/27 |
| 5,278,980 A | | 1/1994 | Pedersen et al. ............... 707/4 |
| 5,301,109 A | * | 4/1994 | Landauer et al. .............. 704/2 |
| 5,675,819 A | * | 10/1997 | Schuetze ....................... 704/10 |
| 5,835,087 A | * | 11/1998 | Herz et al. .................... 345/810 |
| 5,987,446 A | | 11/1999 | Corey et al. ................... 707/3 |
| 6,356,864 B1 | * | 3/2002 | Foltz et al. ................... 434/353 |

OTHER PUBLICATIONS

G. Salton & C. Buckley, "Improving Retrieval Performance by Relevance Feedback", 1990, pp. 355–364, John Wiley & Sons.

* cited by examiner

*Primary Examiner*—Diane D. Mizrahi
*Assistant Examiner*—Apu M Mofiz
(74) *Attorney, Agent, or Firm*—Joseph Giordano

(57) ABSTRACT

Techniques for using latent semantic structure of textual content ascribed to the items to provide automatic recommendations to the user. A user inputs a selected item and, in turn, a latent semantic algorithm is applied to the user selection and the textual content of the items in a database to generate a conceptual similarity between the selection and the items. A set of nearest items to the selected item is provided as a recommendation to the user of other items that may be of particular interest or relevance to the user's original selection based upon the conceptual similarity measure.

18 Claims, 10 Drawing Sheets

SEARCH RESULTS

KEYWORDS: network AND equipment AND building AND system

FAMILY OF DOCUMENTS

| | | |
|---|---|---|
| 2 | FD-15-CD-1USER | Common Network Functionalities - March 2000 |
| | FD-15-CD-2-5USER | Common Network Functionalities - March 2000 |

FAMILY OF REQUIREMENTS

| | | |
|---|---|---|
| 2 | FR-440 | Transport Systems Generic Requirements - April 1999 |
| | FR-64CD-1-1USER | Lata Switching Systems Generic Requirements - January 1999 |

GENERIC REQUIREMENTS

| | | |
|---|---|---|
| 1 | GR-2930 | Network Equipment Building System (NBS) Raised Floor Generic Requirements for Network and Data Centers - November 1996 |

FIG. 2

DOCUMENT NUMBER: GR-2930

ABSTRACT: This document is a module of NEBSFR, FR-2063. This document presents the Telcordia view of generic engineering requirements for raised floors to be used in conjunction with GR-63, "Network Equipment Building System (NEBS) Requirements: Physical Protection," for the support of network and data center equipment. Requirements include physical strength, fire resistance, grounding and bonding, and test methods. These requirements are intended to help assure conformance with Telcordia NEBS requirements to provide the physical protection to equipment by the raised floor.

ORDERING INFORMATION

| MEDIA | PRICE | PAGES | ACTION |
|---|---|---|---|
| Paper | $150.00 | 300 | Add Item to Shopping Basket |

FIG. 3

AUTOMATIC RECOMMENDATION OF PRODUCTS USING LATENT SEMANTIC INDEXING OF CONTENT

BACKGROUND OF THE DISCLOSURE

1. Field of the Invention

This invention relates generally to a procedure for selecting a product by a customer and, more particularly, to methodologies and concomitant circuitry for using latent semantic structure of content ascribed to the products to provide automatic recommendations to the customer.

2. Description of the Background

There are two threads of pertinent subject matter which serve as points of departure for the present invention, namely: (1) work in manipulating personal preferences for recommendations of items; and (2) work in using relevance feedback in information retrieval tasks for items.

The current state of the art with respect to item (1) above is composed of two techniques for providing recommendations. The first is to use a domain expert to handcraft recommendations for a specific item. In this technique, an expert proceeds through a series of items, and notates for each item which additional items should be recommended when a customer chooses the original item. This technique is laborious and is not automatic; for instance, when a new item is introduced, the expert must be consulted again to generate recommendations for the new item. Also, in situations with large sets of items, it becomes less likely that any expert would be familiar with all the items, and so would be less likely to produce a correctly tailored list for all the items that need recommendations. An expert can also provide recommendations to be given for a set of items. While this is possible to consider in the case of a small number of sets, an expert will be quickly overwhelmed in any attempt to provide a comprehensive set of recommendations given the large number of possible combinations of items.

The second prior art technique in recommendations manipulates customer preference data to provide a recommendation. For example, U.S. Pat. No. 4,348,740, entitled "Method and portable apparatus for comparison of stored sets of data," provides a method for sharing preference data, and U.S. Pat. No. 4,870,579, entitled "System and method of predicting subjective reactions," describes a method of using that shared preference data to provide recommendations. Other techniques have built upon this latter reference to promote alternative techniques of using preference data to provide recommendations. There are a number of situations in which using preference data does not generate reasonable recommendations. The first is when, for some reason, preference data is not obtainable, such as for a newly introduced item. The second is when the recommendation is for a task or a situation where preferences are not the overriding concern. For instance, no matter how well-liked a "bicycle" is, if the task is moving furniture, a less preferred "truck" would be a more appropriate recommendation than any type of "bicycle".

The second thread of pertinent background subject matter (item (2) above) is the use of relevance feedback in information retrieval tasks. Relevance feedback consists of the idea of modifying a subsequent information query by using feedback from the user as to the relevance of information retrieved in a previous query. For instance, a user enters a query, and an information retrieval system returns a set of responses. The user then indicates which of these responses is most relevant to the query, and the query is modified to use this relevance information in producing another query. The first use of relevance feedback is attributed to Rocchio in the reference "Document retrieval systems—optimization and evaluation", a Doctoral Dissertation by Rocchio J. J. Jr. (1966), Harvard University, in Report ISR-10, to the National Science Foundation, Harvard computational Laboratory, Cambridge, Mass. This is the seminal document referred to in modem relevance feedback literature such as the "Improving Retrieval Performance by Relevance Feedback" chapter by Salton and Buckley (1988) in "Readings in Information Retrieval", edited by Jones and Willett, 1997.

The prior art is devoid of a method such that the two threads of pertinent prior art coalesced whereby relevance feedback is used to automatically provide recommendations.

SUMMARY OF THE INVENTION

Shortcomings and limitations of the prior art are obviated, in accordance with the present invention, by a methodology and concomitant circuitry wherein the customer (alternatively, purchaser, consumer, or user, as the case may be) is allowed to find items using either a search engine or by browsing a catalog of items. Then the act of placing an item in the customer's electronic shopping basket (alternatively, shopping cart) is used as an indication that the customer prefers that item. Finally, the basket item provides relevance feedback upon which to build a query to find items like the item in the basket. Thus, in accordance with the present invention, relevance feedback serves as the basis whereby the relevance feedback is modified and then applied to supply a recommendation.

Broadly, in accordance with a method aspect of the present invention, a method for automatically recommending textual items stored in a database to a user of a computer-implemented service, the user having selected one of the items, includes: (a) applying a latent semantic algorithm to the textual items to establish a conceptual similarity among the textual items and the selected item; and (b) outputting to the user a recommended set of nearest items to the selected item based upon the conceptual similarity.

Broadly, in accordance a one system aspect of the present invention, a system for automatically recommending textual items stored in a database to a user of a computer-implemented service includes: (a) a processor for applying a latent semantic algorithm to the textual items to establish a conceptual similarity among the textual items and one of the items selected by the user; and (b) means for outputting to the user a recommended set of nearest items to the selected item with reference to the conceptual similarity among the textual items and the selected item.

BRIEF DESCRIPTION OF THE DRAWINGS

The teachings of the present invention can be readily understood by considering the following detailed description in conjunction with the accompanying drawings, in which:

FIG. 2 depicts a screen display presenting the response by the system to the search request of FIG. 1 as initiated by the customer;

FIG. 3 depicts a screen display presenting the response by the system to the customer's request for more detailed information about one item displayed in FIG. 2;

To facilitate understanding, identical reference numerals have been used, where possible, to designate elements that are common to the figures.

DETAILED DESCRIPTION

It is instructive to first consider a "guided tour" on the manner in which a purchaser of documents interacts with the inventive system; this guided tour is best illustrated by viewing a sequence of personal computer screen displays that depicts purchaser inputs and then responses by the system as configured with the features of the present invention. This guided tour has the advantage of introducing terminology useful for later describing details of: (a) the methodology in terms of a flow diagram; and (b) the system in terms of a high-level block diagram.

For the sake of specificity, but without loss of generality, it is presumed that the system is configured for merchandising documents on-line over the Internet. The principles of the inventive subject matter can be readily applied to other merchandising applications, either on-line or even in a non-Internet application, such as the sale of physical, non-textual items or products which have a corresponding written description. For instance, electronic components could be summarized by a written description with such summary description forming the basis for a "document search". In addition, audio materials, video tapes, works-of-art, electronic products, and so forth, could be described in terms of a summary, and again such a summary forms the basis for a document search.

For purposes of the immediate discussion, the system should be visualized as a Web server accessible from a purchaser's personal computer (PC) over the Internet; the PC includes a monitor for displaying Web pages on the monitor's screen, a keyboard, and a "mouse". The system is configured with a set of application programs for servicing the purchaser's on-line inputs to the system from the PC.

The particular set of screen displays selected for the guided tour traces only one path of purchaser interaction through the system. However, this path is typical of the use of the system and, moreover, immediately and explicitly highlights the major differences between the present inventive subject matter and the prior art systems discussed in the Background Section. Because the present inventive system is versatile so as to accommodate the needs of many different types of purchasers, this path of the guided tour is but one of many potential paths through the system. Later, a detailed flow diagram of the methodology of the present invention win be presented which depicts the full versatility of the present invention.

Also, in order to ensure that the guided tour is truly informative of the major point-of-departure of the inventive subject matter from the prior art, certain presumptions are made about the status of the system as the purchaser logs-on to the system. Thus, for the guided tour, it is presumed that the purchaser has already viewed the merchandiser's home Web page and has navigated to the point of accessing the merchandiser's Web page to search for items available from the merchandiser.

Figure 1:
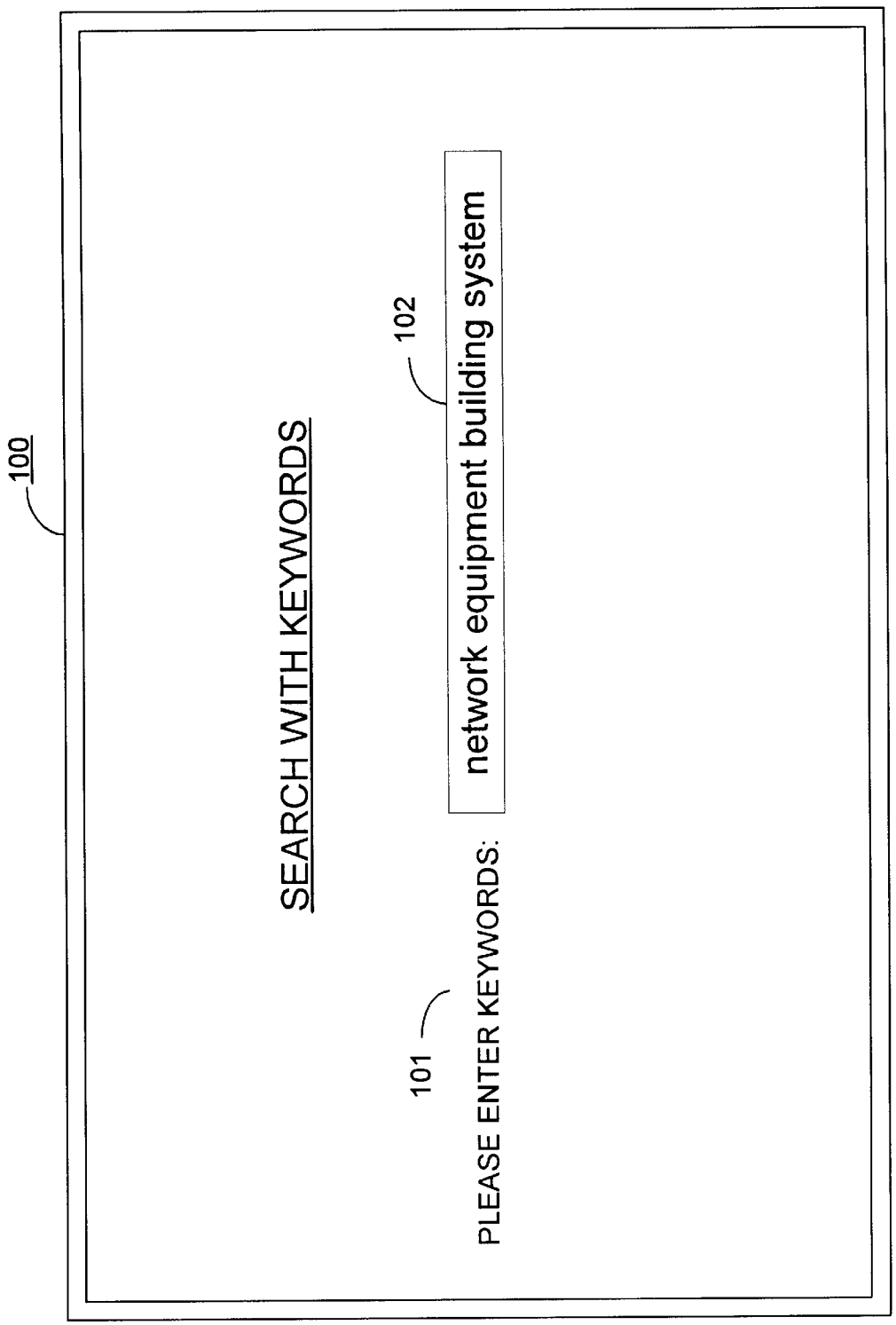
FIG. 1 depicts a screen display, presented to the customer by the system in accordance with the present invention, the screen display facilitating input by a customer to initiate a search for an item using keywords.

With reference to FIG. 1, there is shown screen display 100 which appears on the purchaser's PC monitor in response to a request by the purchaser to access the Search aspect of the system (such as by clicking on a "SEARCH" request button on the on-line merchandiser's home Web page (not shown)). The Web page shown on display 100 results from clicking on a "SEARCH WITH KEYWORDS" region of such merchandiser's home page, as repeated for reminder purposes on display 100. As then shown by reference numeral 101, the purchaser is prompted to enter keywords into "boxed" display area 102, which is empty when initially displayed by the system. Here, the words "network equipment building system" are keywords typed by the purchaser into display area 102.

Now with reference to FIG. 2, there is shown screen display 200 which results from submitting the Search request of FIG. 1 to the system. In particular with reference to display 200, box area 201 repeats the keywords input by the purchaser for ready reference. Document category titles 210, 220, and 230 show, respectively, the documents located in the search and categorized according to the category titles. For instance, referring now to document title category 220 "Family of Requirements", 2 documents were located as a result of the search, namely, FR-440 entitled "transport Systems Generic Requirements—April 1999", and FR-64CD-1-1USER entitled "Lata Switching Systems Generic Requirements—January 1999". Similarly, under document title category 230, reference numeral 231 identifies the single document located in the search, namely, GR-2930 entitled "Network Equipment . . . and Data Centers—November, 1996."

It is now supposed that the purchaser desires to learn more details about the document having reference numeral 231. To facilitate access to such details, each document is presented on screen display 200 as a hypertext link, so that the purchaser needs only to "click on" the document, either its document reference number (e.g., GR-2930) or its title (e.g., "Network Equipment . . . and Data Centers—November 1996"). It is further supposed that the purchaser calls into view the details of the single document under the "Generic Requirements" document category 230 by clicking on GR-2930.

The detailed information pertaining to this document presented to the purchaser as a result of clicking on GR-2930 is shown in screen display 300 of FIG. 3. In particular, the ABSTRACT of the document, referred to by reference numeral 301, is displayed in the upper portion of screen display 300. In the lower portion of display 300, as shown by reference numeral 310, is ORDERING INFORMATION for this document. Reference numeral 311 points to the MEDIA box, and an associated box filled-in with the term "Paper", which summarize the medium in which the document is available. In addition, reference numeral 312 points to the PRICE box, and an associated box filled-in with the term $150.00", which summarize the cost of the document. Reference numeral 313 points to the PAGES box, and an associated box filled-in with the term "300", which summarize the size of the document. Finally, reference numeral 314 points to the ACTION box, and an associated box having the term "Add Item to Shopping Basket" displayed, which summarize a possible action which may be taken by the purchaser.

Figure 4:
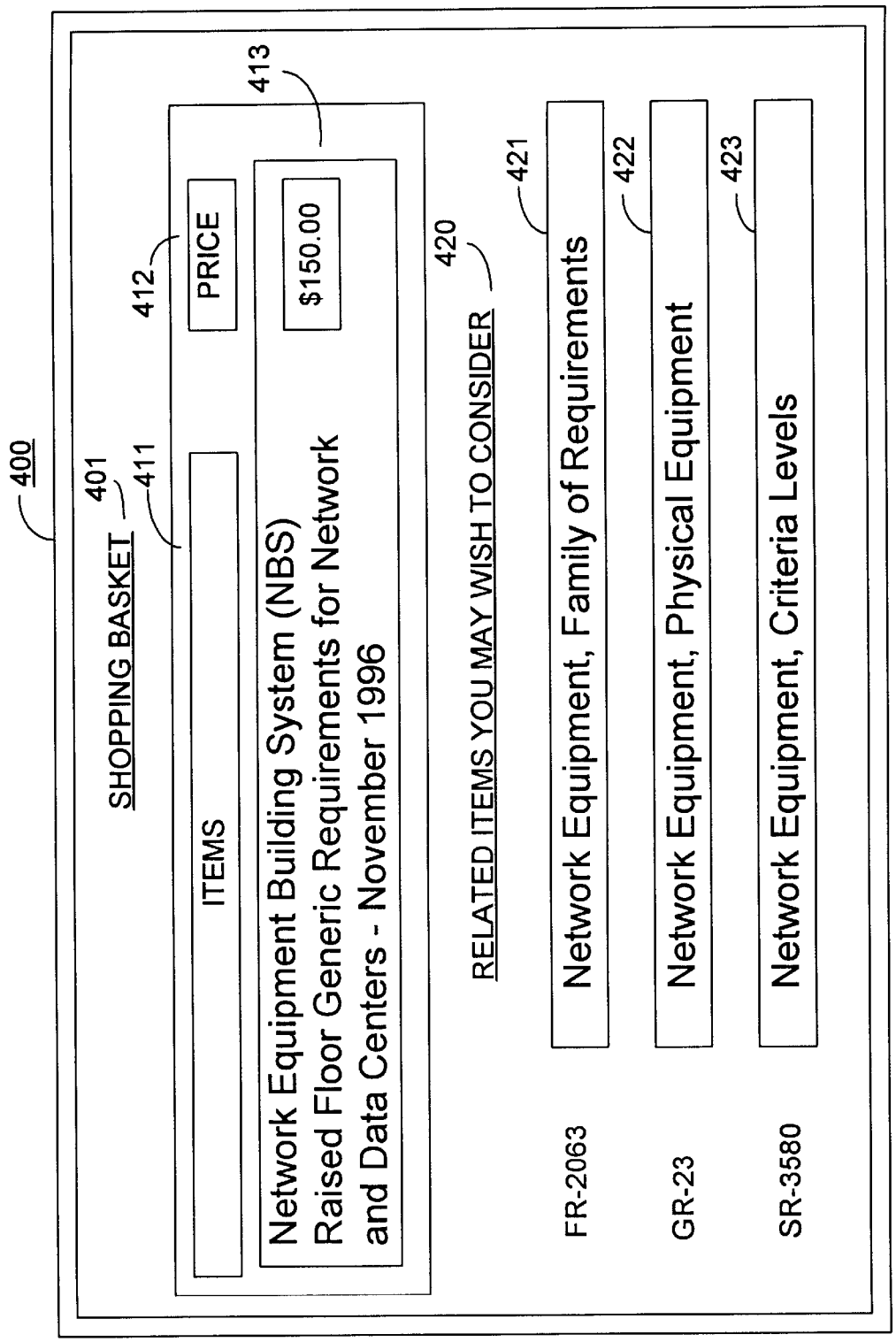
FIG. 4 depicts a screen display presenting the response by the system to the customer's request to add the item detailed in FIG. 3 to the customer's shopping cart, including recommendations presented by the system based upon the item so selected by the customer.

Next, it is supposed that the purchaser does, in fact, decide to add document GR-2930 to the shopping basket by clicking on "Add Item to Shopping Basket" in FIG. 3; screen display 400 of FIG. 4 depicts the result of this click-on activity. Reference numeral 401 indicates that the screen display is the SHOPPING BASKET for reminder purposes. The portion below the heading SHOPPING BASKET displays the contents of the shopping basket, which to this point is the single document shown by its title "Network Equipment . . . and Data Centers—January 1996", along with the price (reference numeral 412) of each item (reference numeral 411) for each item displayed; for this single document, the price is $150.00 (reference numeral 413), as also displayed earlier in FIG. 3.

The bottom half of screen display 400, having the heading RELATED ITEMS YOU MAY WISH TO CONSIDER (reference numeral 420), displays three system-recommended documents as generated by an algorithm carried out by the on-line merchandiser's system—the algorithm being transparent to the purchaser. The recommendation for this illustration is based upon the latest document placed into the shopping basket by the purchaser. The method to arrive at the recommendation is discussed in detail in the sequel.

Illustrative Flow Diagram of the Method Effected by the System

Figure 5:
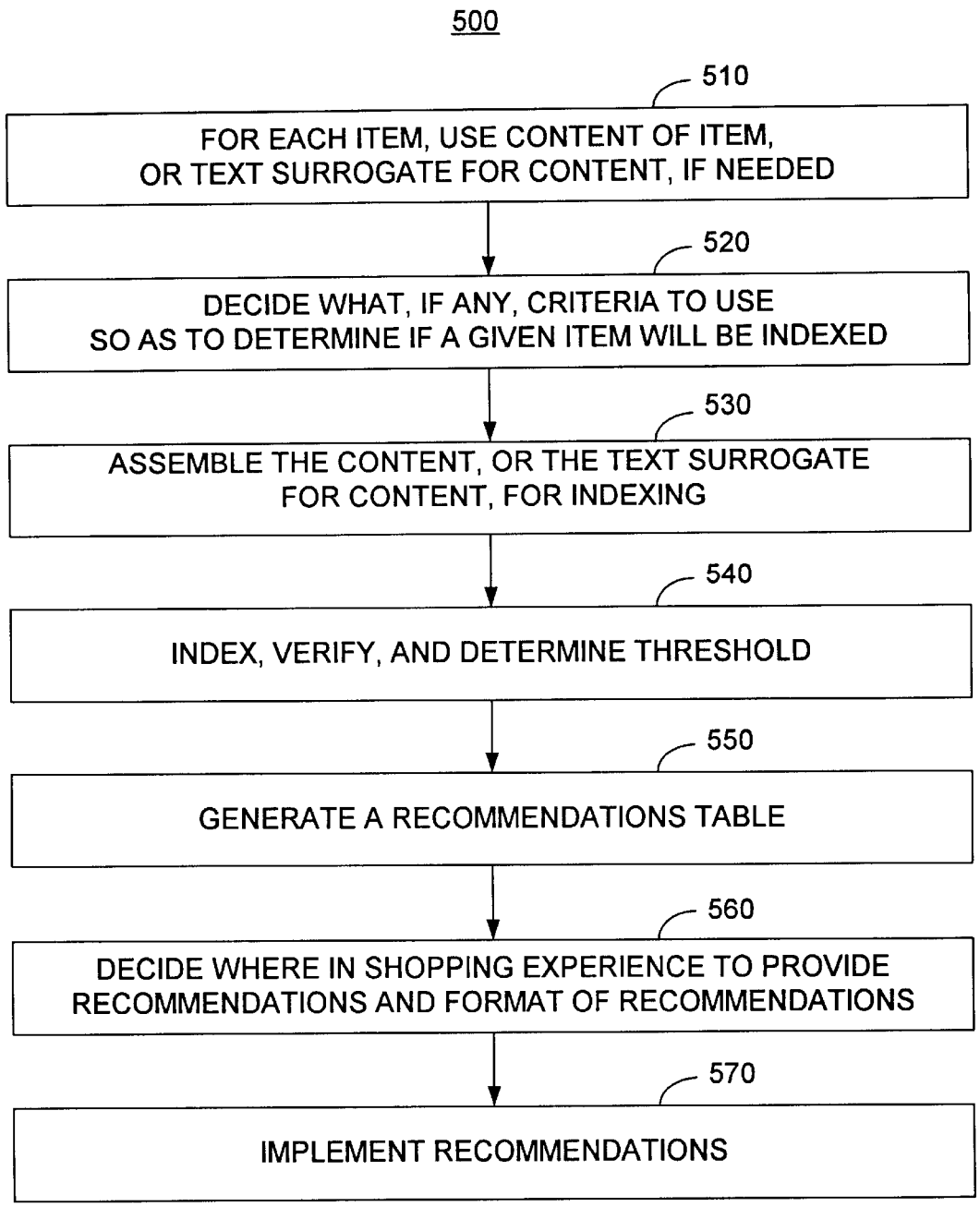
FIG. 5 depicts a flow diagram of the method in accordance with the present invention to thereby determine the recommendations presented to the customer in FIG. 4.

With reference to FIG. 5, there is shown flow diagram 500 which summarizes the sequence of steps carried out to present and display the information of FIGS. 1–4. The processing blocks 510–570 are described as follows.

Processing Block 510: Decide Whether to Use the Content or Text Surrogates for the Content.

For instance, in one illustrative example of the system, the products/items are documents. If the system implementers do not have the full text of the documents, it is possible to use the abstracts of the documents as surrogates for the documents themselves.

Processing Block 520: Decide What, if any, Criteria Will be Used to Determine if a Given Product Will be Indexed.

In the example, not all documents may be deemed as "good" recommendations. For instance, it may not be advantageous to recommend free sales material. Additionally, certain products may be available under different licensing terms—for instance, there may be separate products with different right-to-use clauses, e.g., there are separate product numbers for use by one person, use by 2–5 people, use by 10–100 people, and so forth, so it may be desirable to only recommend the use-by-one-person product.

Processing Block 530: Assemble the Content or Text Surrogates for the Content for Indexing.

For the exemplary system, the abstracts of the documents were embedded in a software file, which was a representation of the catalog available to purchasers. The criteria as arrived at via processing block 520 are then used to filter out any documents that did not meet the criteria, that is, to arrive at "good" candidates for recommendations. All desired abstracts were then stored into another software file that is a useful format for indexing by the Latent Semantic Index (LSI) algorithm, which will be discussed in more detail in the sequel.

Processing Block 540: Index, Verify, and Determine a Threshold

The abstracts were indexed using the LSI algorithm There are a number of parameters that can be specified in the indexing process, such as word weighting, and number of dimensions for the scaling. For example, log entropy weighting was used since the implementer's experience with the LSI algorithm leads to the best results. The LSI algorithm generates a new vector space with vector positions for all the indexed terms and documents, where the cosine distance between item vectors is a measure of the items' semantic distance. The set of documents is then sampled, and checked for the closest documents, to make sure that the parameter choices led to "reasonable" results. As part of this sampling process it was noted that items with a distance, or score below 0.6 were unlikely to be relevant to the item, so a threshold of 0.6 was established.

Processing Block 550: Generate a Recommendations Table

A set of the ten closest items for each item in the catalog was generated. To this set the threshold determined in Step 4 was applied, with any items with a threshold below 0.6 being eliminated. Next, a table was compiled where each row contained the item and the recommended items. For this example, one file for each item was compiled in the scaling that contains the recommended items. This file serves as the database of recommended items for the interface.

Processing Block 560: Decide Where in Shopping Experience to Provide Recommendations and Format of Recommendations It was determined for this illustrative example to provide a recommendation to the customer each time this customer added an item to their shopping basket. The recommendation set determined by the newly added item was filtered to not include any items that were already in the customer's shopping basket. The recommendations are displayed on the same screen display as the shopping basket and show the titles of the recommended items (e.g., 421–423 in FIG. 4), which are implemented as hyperlinks. Clicking on the link takes the customer to more information and the opportunity to purchase the recommended item. Based on space constraints on the shopping basket screen display (e.g., a web page), a reasonable compromise was to display at most four recommended items; this number is arbitrary and configurable based upon the application environment of the invention.

Processing Block 570: Implement Recommendations

When the customer adds an item to their shopping basket, the recommendation files are accessed to retrieve the compiled recommendations from the stored files. The recommendations are filtered to not repeat any items already in the basket, and trimmed to show at most 4 items.

Heuristic Example

Before discussing the principles and operational characteristics of this invention in detail, it is helpful to present a motivating example of a Latent Semantic Indexing algorithm (with reference to U.S. Pat. No. 4,839,853).

The contents of Table 1 are used to illustrate how semantic structure analysis works and to point out the differences between this method and conventional keyword matching.

TABLE 1

| | |
|---|---|
| c1 | Human machine interface for Lab ABC computer applications |
| c2 | A survey of user opining of computer response time |
| c3 | The EPS user interface management system |
| c4 | Systems and human systems engineering testing of EPS-2 |
| c5 | Relation of user-perceived response time to error measurement |
| m1 | The generation of random, binary, unordered trees |
| m2 | The intersection graph of paths in trees |
| m3 | Graph minors IV: widths of tress and well-quasi-ordering |
| m4 | Graph minors: a survey |

In this example, a file of text objects is composed of nine technical documents with titles c1–c5 concerned with human/computer interactions, and titles m1–m4 concerned with mathematical graph theory. Using conventional keyword retrieval, if a user requested papers dealing with "human computer interaction", titles c1, c2, and c4 would be returned since these titles contain at least one keyword from the user request. However, c3 and c5, while related to the query, would not be returned since they share no words in common with the request. It is now shown how latent semantic structure analysis treats this request to return titles c3 and c5.

Table 2 depicts the "term-by-document" matrix for the nine technical document titles. Each cell, (i,j), is the frequency of occurrence of term i in document j. This basic term-by-document matrix or a mathematical transformation thereof is used as input to the statistical procedure described below.

TABLE 2

| | DOCUMENTS | | | | | | | | |
|---|---|---|---|---|---|---|---|---|---|
| TERMS | c1 | c2 | c3 | c4 | c5 | m1 | m2 | m3 | m4 |
| human | 1 | 0 | 0 | 1 | 0 | 0 | 0 | 0 | 0 |
| interface | 1 | 0 | 1 | 0 | 0 | 0 | 0 | 0 | 0 |
| computer | 1 | 1 | 0 | 0 | 0 | 0 | 0 | 0 | 0 |
| user | 0 | 1 | 1 | 0 | 1 | 0 | 0 | 0 | 0 |
| system | 0 | 1 | 1 | 2 | 0 | 0 | 0 | 0 | 0 |
| response | 0 | 1 | 0 | 0 | 1 | 0 | 0 | 0 | 0 |
| time | 0 | 1 | 0 | 0 | 1 | 0 | 0 | 0 | 0 |
| EPS | 0 | 0 | 1 | 1 | 0 | 0 | 0 | 0 | 0 |
| survey | 0 | 1 | 0 | 0 | 0 | 0 | 0 | 0 | 1 |
| tree | 0 | 0 | 0 | 0 | 0 | 1 | 1 | 1 | 0 |
| graph | 0 | 0 | 0 | 0 | 0 | 0 | 1 | 1 | 1 |
| minor | 0 | 0 | 0 | 0 | 0 | 0 | 0 | 1 | 1 |

Figure 6:
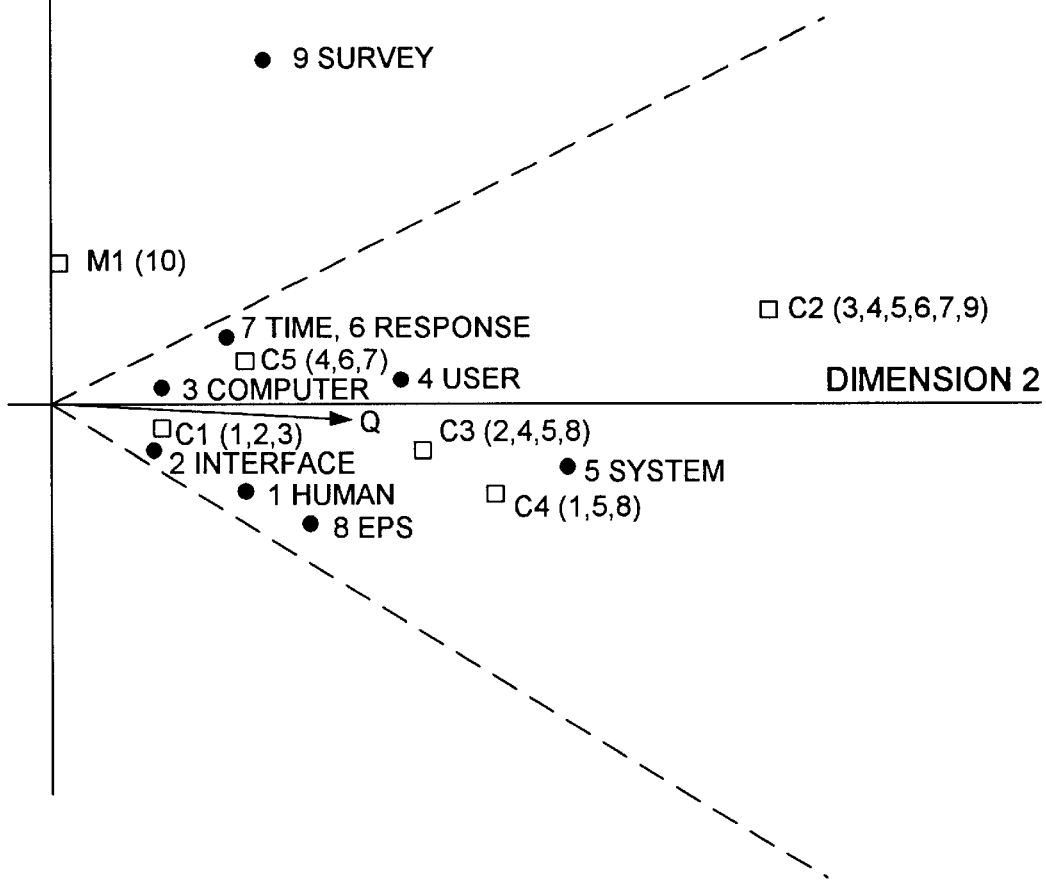
FIG. 6 is a plot of the "term" coordinates and the "document" coordinates based on a two-dimensional singular value decomposition of an original "term-by-document" matrix.

For this example, the documents and terms have been carefullly selected to yield a "good" approximation in just two dimensions for expository purposes. FIG. 6 is a two-dimensional graphical representation of the two largest dimensions resulting from the statistical processing via singular value decomposition (SVD). Both document titles and the terms used in them are fit into the same space. Terms are shown as circles and labeled by number. Document titles are represented by squares with the numbers of constituent terms indicated parenthetically. The cosine or dot product between two objects (terms or documents) describes their estimated similarity. In this representation, the two types of documents form two distinct groups: all the mathematical graph theory documents (m1–m4) occupy the same region in space (basically along Dimension 1 of FIG. 6), whereas a quite distinct group is formed for human/machine interaction titles (c1–c5) (essentially along Dimension 2 of FIG. 6).

To respond to a user query about "human computer interaction", the query is first folded into this two-dimensional space using those terms that occur in the space (namely, "human" and "computer"). The query vector is located in the direction of the weighted average of these constituent terms, and is denoted by a directional arrow labeled "Q" in FIG. 6. A measure of the closeness or similarity is related to the angle between the query vector and any given term or document vector. One such measure is the cosine between the query vector and a given term or document vector. In FIG. 6, the cosine between the query vector and each of the c1–c5 titles is greater than 0.90; the angle corresponding to the cosine value of 0.90 with the query vector is shown by dashed lines in FIG. 6. With this technique, documents c3 and c5 would be returned as matches to the user query, even though they share no common terms with the query. This is because the latent semantic structure, as captured by the depiction of FIG. 6, fits the overall pattern of usage across documents.

Description of Singular Value Decomposition

To obtain the data to plot FIG. 6, the "term-by-document" matrix of Table 2 is decomposed using Singular Value Decomposition (SVD). A reduced SVD is employed to approximate the original matrix in terms of a much smaller number of orthogonal dimensions. This reduced SVD is used for retrieval; it describes major associational structures in the matrix but it ignores small variations in word usage. The number of dimensions to adequately represent a particular domain is largely an empirical matter. If the number of dimensions is too large, random noise or variations in word usage will be remodeled. If the number of dimensions is too small, significant semantic distinctions will remain un-captured. For diverse information sources, 100 or more dimensions may be needed.

To illustrate the decomposition technique, the "term by-document" matrix, denoted Y, is decomposed into three other matrices, namely, the term matrix (TERM), the document matrix (DOCUMENT), and a diagonal matrix of singular values (DIAGONAL), as follows:

$$Y_{t,d} = TERM_{t,m} DIAGONAL_{m,m} DOCUMENT_{m,d},$$

where Y is the original t-by-d matrix, TERM is the t-by-m term matrix with unit-length orthogonal columns, DOCUMENT is the m-by-d document matrix with unit-length orthogonal columns, and DIAGONAL is the m-by-m diagonal matrix of singular values typically ordered by magnitude. The dimensionality of the full solution, denoted m, is the rank of the t-by-d matrix, that is, $m \leq \min(t,d)$. Tables 3, 4, and 5 below show the TERM and DOCUMENT matrices and the diagonal elements of the DIAGONAL matrix, respectively, as found via SVD.

TABLE 3

TERM MATRIX (12 terms by 9 documents)

| | | | | | | | | | |
|---|---|---|---|---|---|---|---|---|---|
| human | 0.22 | −0.11 | 0.29 | −0.41 | −0.11 | −0.34 | −0.52 | −0.06 | −0.41 |
| inter-face | 0.20 | −0.07 | 0.14 | −0.55 | 0.28 | 0.50 | −0.07 | −0.01 | −0.11 |
| com-puter | 0.24 | 0.04 | −0.16 | −0.59 | −0.11 | −0.25 | −0.30 | 0.06 | 0.49 |
| user | 0.40 | 0.06 | −0.34 | 0.10 | 0.33 | 0.38 | 0.00 | 0.00 | 0.01 |
| system | 0.64 | −0.17 | 0.36 | 0.33 | −0.16 | −0.21 | −0.16 | 0.03 | 0.27 |
| re-sponse | 0.26 | 0.11 | −0.42 | 0.07 | 0.08 | −0.17 | 0.28 | −0.02 | −0.05 |
| time | 0.26 | 0.11 | −0.42 | 0.07 | 0.08 | −0.17 | 0.28 | −0.02 | −0.05 |

TABLE 3-continued

TERM MATRIX (12 terms by 9 documents)

| EPS    | 0.30 | −0.14 | 0.33  | 0.19  | 0.11  | 0.27  | 0.03  | −0.02 | −0.16 |
|--------|------|-------|-------|-------|-------|-------|-------|-------|-------|
| survey | 0.20 | 0.27  | −0.18 | −0.03 | −0.54 | 0.08  | −0.47 | −0.04 | −0.58 |
| tree   | 0.01 | 0.49  | 0.23  | 0.02  | 0.59  | −0.39 | −0.29 | 0.25  | −0.22 |
| graph  | 0.04 | 0.62  | 0.22  | 0.00  | −0.07 | 0.11  | 0.16  | −0.68 | 0.23  |
| minor  | 0.03 | 0.45  | 0.14  | −0.01 | −0.30 | 0.28  | 0.34  | 0.68  | 0.18  |

TABLE 4

DOCUMENT MATRIX (9 terms by 9 documents)

| c1 | 0.20 | −0.06 | 0.11 | −0.95 | 0.04  | −0.08 | 0.18  | −0.01 | −0.06 |
|----|------|-------|------|-------|-------|-------|-------|-------|-------|
| c2 | 0.60 | 0.16  | 0.50 | −0.03 | −0.21 | −0.02 | −0.43 | 0.05  | 0.24  |
| c3 | 0.46 | −0.13 | 0.21 | 0.04  | 0.38  | 0.07  | −0.24 | 0.01  | 0.02  |
| c4 | 0.54 | −0.23 | 0.57 | 0.27  | −0.20 | −0.04 | 0.26  | −0.02 | −0.08 |
| c5 | 0.28 | 0.11  | 0.50 | 0.15  | 0.33  | 0.03  | 0.67  | −0.06 | −0.26 |
| m1 | 0.00 | 0.19  | 0.10 | 0.02  | 0.39  | −0.30 | −0.34 | 0.45  | −0.62 |
| m2 | 0.01 | 0.44  | 0.19 | 0.02  | 0.35  | −0.21 | −0.15 | −0.76 | 0.02  |
| m3 | 0.02 | 0.62  | 0.25 | 0.01  | 0.15  | 0.00  | 0.25  | 0.45  | 0.52  |
| m4 | 0.08 | 0.53  | 0.08 | −0.02 | −0.60 | 0.36  | 0.04  | −0.07 | −0.45 |

TABLE 5

DIAGONAL (9 singular values)

| 3.34 | 2.54 | 2.35 | 1.64 | 1.50 | 1.31 | 0.84 | 0.56 | 0.36 |
|------|------|------|------|------|------|------|------|------|

As alluded to earlier, data to plot FIG. 6 was obtained by presuming that two-dimensions are sufficient to capture the major associational structure of the t-by-d Y matrix, that is, m is set to two in the expression for $Y_{t,d}$, yielding an approximation of the original matrix. Only the first two columns of the TERM and DOCUMENT matrices are considered with the remaining columns being ignored for illustrative purposes. Thus, the term data point corresponding to "human" in FIG. 6 is plotted with coordinates (0.22,−0.11), which are extracted from the first row and the two left-most columns of the TERM matrix. Similarly, the document data point corresponding to title m1 has coordinates (0.00,0.19), coming from row six and the two left-most columns of the DOCUMENT matrix.

General Model Details

It is now elucidating to describe in somewhat more detail the mathematical model underlying the latent structure, singular value decomposition technique.

Any rectangular matrix Y of t rows and d columns, for example, a t-by-d matrix of terms and documents, can be decomposed into a product of three other matrices:

$$Y = T_o S_o D_o^t, \quad (1)$$

where $D_o^t$ is the transpose of $D_o$, and such that $T_o$ and $D_o$ have unit-length orthogonal columns, (i.e., $T_o^t T_o = I$ and $D_o^t D_o = I$) and $S_o$ is diagonal. This is called the Singular Value Decomposition (SVD) of Y. (A procedure for SVD is described in the text "Numerical Recipes—The Art of Scientific Computing", especially Chapter 2, by Press, Flannery, Teukolsky, and Vetterling, 1986, Cambridge University Press, Cambridge, England). $T_o$ and $D_o$ are the matrices of left and right singular vectors and $S_o$ is the diagonal matrix of singular values. By convention, the diagonal elements of $S_o$ are ordered in decreasing magnitude.

With SVD, it is possible to devise a simple strategy for an optimal approximation to Y using smaller matrices. The k largest singular values and their associated columns in $T_o$ and $D_o$ may be kept and the remaining entries set to zero. The product of the resulting matrices is a matrix $Y_R$ which is approximately equal to Y, and is of rank k. The new matrix $Y_R$ is the matrix of rank k closest in the least squares sense to Y. Since zeros were introduced into $S_o$, the representation of $S_o$ can be simplified by deleting the rows and columns having these zeros to obtain a new diagonal matrix S, and then deleting the corresponding columns of $T_o$ and $D_o$ to define new matrices T and D, respectively. The result is a reduced model such that $$Y_R = TSD^t. \quad (2)$$

The value of k is chosen for each application; it is generally such that $k \geq 100$ for a collection of 100–3000 text objects (e.g., documents).

For discussion purposes, it is useful to interpret the SVD geometrically. The rows of the reduced matrices T and D may be taken as vectors representing terms and documents, respectively, in a k-dimensional space. With appropriate rescaling of the axes, by quantities related to the associated diagonal values of S, dot products between points in the space can be used to access and compare objects. (A simplified approach which did not involve rescaling was used to plot the data of FIG. 6, but this was strictly for expository purposes). These techniques are now described.

Fundamental Comparisons

There are basically three types of comparisons of interest; (i) those comparing two terms; (ii) those comparing two documents or text objects; and (iii) those comparing a term and a document or text object. As used throughout, the notion of a text object or a data object is general, whereas a document is a specific instance of a text object or a data object. Also, text or data objects are stored in the computer system in files.

Two Terms

In the data, the dot product between two row vectors of $Y_R$ tells the extent to which two terms have a similar pattern of occurrence across the set of documents. The matrix $Y_R Y_R^t$ is the square symmetric matrix approximation containing all the term-by-term dot products. Using equation (2), $$Y_R Y_R^t = (TSD^t)(TSD^t)^t = TS^2 T^t = (TS)(TS)^t. \quad (3)$$

This means that the dot product between the i-th row and the j-th row of $Y_R$ can be obtained by calculating the dot product between the i-th and j-th rows of the TS matrix. That is, considering the rows of TS as vectors representing the terms, dot products between these vectors give the comparison between terms. The relation between taking the rows of T as vectors and those of TS is simple since S is a diagonal matrix; each vector element has been stretched our shrunk by the corresponding element of S.

Two Documents

In this case, the dot product is between two column vectors of Y. The document-by-document dot product is approximated by:

$$Y_R^t Y_R = (TSD^t)^t(TSD^t) = DS^2 D^t = (DS)(DS)^t. \quad (4)$$

Thus the rows of the DS matrix are taken as vectors representing the documents, and the comparison is via the dot product between the rows of the DS matrix.

Term and Document

This comparison is somewhat different. Instead of trying to estimate the dot product between rows or between columns of Y, the fundamental comparison between a term and a document is the value of the individual cell in Y. The approximation of Y is simply equation (2), i.e., $Y_R=TSD^t$. The i,j cell of $Y_R$ may therefore be obtained by taking the dot product between the i-th row of the matrix $TS^{1/2}$. While the "within" (terms or documents) comparisons involved using rows of TS and DS as vectors, the "between" comparisons requires $TS^{1/2}$ or $DS^{1/2}$ for coordinates. Thus it is not possible to make a single configuration of points in a space that will allow both "between" and "within" comparisons. They will be similar, however, differing only by a stretching or shrinking of the dimensional elements by a factor $S^{1/2}$.

Representations of Pseudo-Objects

The previous results show how it is possible to compute comparisons between the various objects associated with the rows or columns of Y. It is very important in information retrieval applications to compute similar comparison quantities for objects such as queries that do not appear explicitly in Y. For example, it is necessary to be able to take a completely novel query, find a location in k-dimensional latent semantic space for it, and then evaluate its cosine or inner product with respect to terms or objects in the space. Another example would be trying, after-the-fact, to find a representations for documents that did not appear in the original space. The new objects for both these examples are equivalent to objects in the matrix Y in that they may be represented as vectors of terms. For this reason, they are called "pseudo-documents" specifically or "pseudo-objects" generically. In order to compare pseudo-documents to other documents, the starting point is defining a pseudo-document vector, designated $Y_q$. Then the representation $D_q$ is derived such that $D_q$ can be used just like a row of D in the comparison relationships described in the foregoing sections. One criterion for such a derivation is that the insertion of a real document $Y_i$ should give $D_i$ when the model is ideal (i.e., $Y=Y_R$). With this constraint, $$Y_q=TSD_q^t$$

or, since $T^tT$ equals the identity matrix, $$D_q^t=S^{-1}T^tY_q$$

or, finally, $$D_q=Y_q^tTS^{-1}. \qquad (5)$$

Thus, with appropriate rescaling of the axes, this amounts to placing the pseudo-objects at the vector sum of its corresponding term points. Then $D_q$ may be used like any row of D and, appropriately scaled by S or $S^{1/2}$, can be used like a usual document vector for making "within" and "between" comparisons. It is to be noted that if the measure of similarity to be used in comparing the query against all documents is one in which only the angle between the vectors is important (such as the cosine measure), there is no difference for comparison purposes between placing the query at the vector average or the vector sum of the terms.

Methodology of An Illustrative Embodiment

Figure 7:
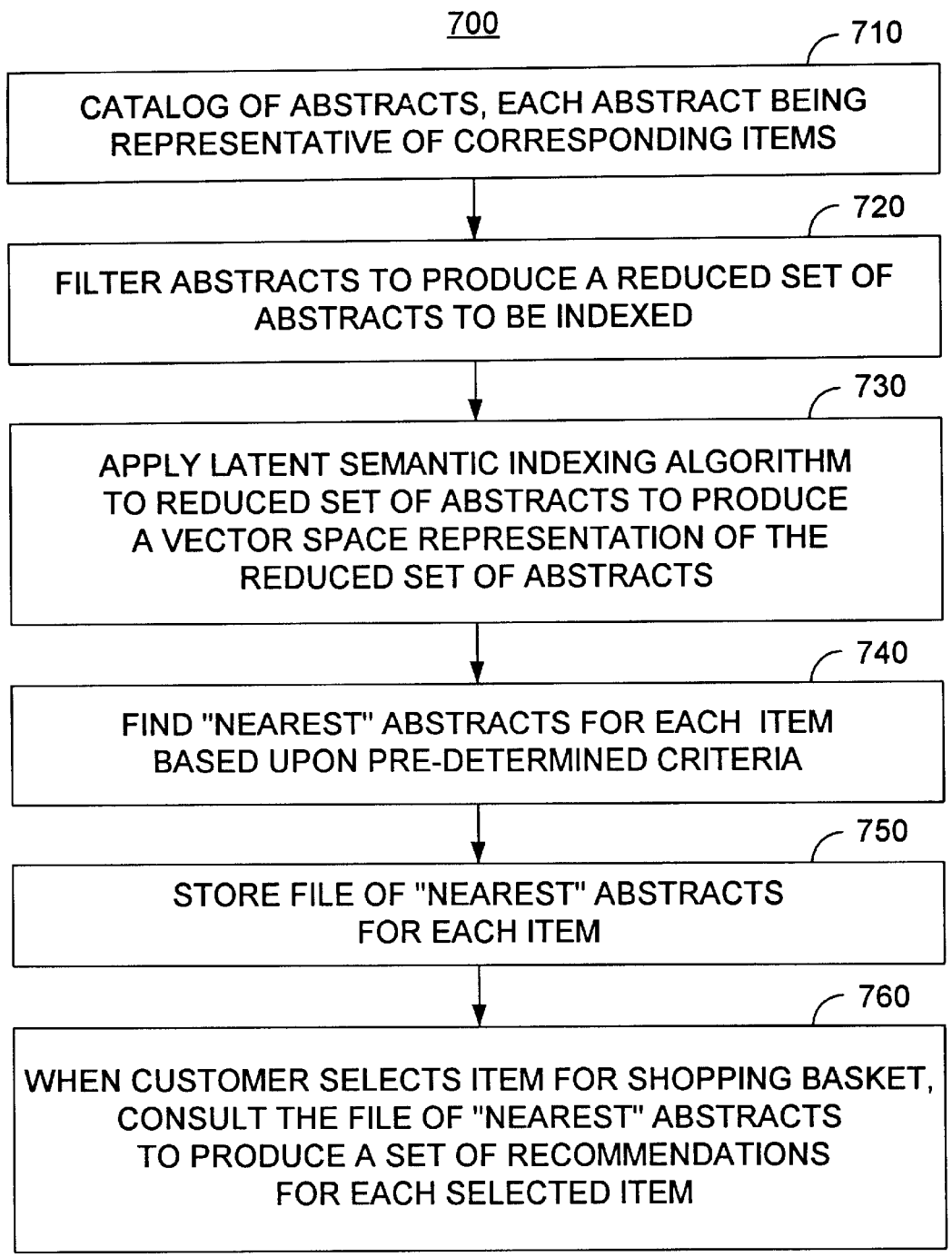
FIG. 7 depicts a flow diagram of the method in accordance with one illustrative embodiment of the present invention relating to document abstracts to generate recommendations of pertinent items to the customer based upon the customer's selection actions.

The foundational principles presented in the foregoing sections are now applied to describe the methodology, with reference to FIG. 7, used to generate the screens displays of FIGS. 1–4—FIG. 7 amplifies on and/or encapsulates certain method steps of FIG. 5 that are particular to the illustrative example of FIGS. 1–4. Processing block 710 depicts that the starting point in the process of FIG. 7 is a catalog of abstracts, with each abstract being representative of a corresponding item (e.g., a full document). Next, processing block 720 is executed to filter the catalog of abstracts to yield a reduced set of abstracts for processing by the latent semantic indexing algorithm—recall that documents are culled so that only "good" recommendations are offered to the purchaser. Then, processing block 730 is invoked apply the latent semantic indexing algorithm to the reduced set of abstracts to produce a vector space representation of the reduced set of abstracts.

With reference to the foundational principles of the previous Sections, the "term-by-document" matrix Y is formed from the terms in the reduced set of abstracts (which are now the documents). Then Singular Value Decomposition is applied, and the dimensionality of the space is selected to generate the vector space representation of the reduced set of abstracts, that is, the k largest singular values are selected to yield the approximation matrix $Y_R$.

Once the vector space representation is generated by processing block 730, processing block 740 is used to find so-called "nearest" abstracts for each abstract in the reduced set of abstracts. To accomplish this, the type of comparison utilized is the "Two Documents" comparison already discussed above. Recall in this case, the dot product is between two column vectors of Y. The document-by-document dot product is approximated by:

$$Y_R^tY_R=(TSD^t)^t(TSD^t)=DS^2D^t=(DS)(DS)^t.$$

Thus the rows of the DS matrix are taken as vectors representing the documents, and the comparison is via the dot product between the rows of the DS matrix. To determine the "nearest" abstracts, the cosine measure is used to gauge the closeness of all other abstracts to the given abstract under consideration, that is, one-by-one each abstract is taken as a reference document and the cosine measure of all other abstracts to the given abstract is computed. The "nearest" abstracts are determined based upon pre-determined criteria, such as, the cosine being no less than 0.6 and selection of only the four closest abstracts.

Once generated, the "nearest" abstracts are stored in a file for later recall during the actual "search" activity by the purchaser, as evidenced by processing block 750. Recommendations to a purchaser are expedited because the "nearest" abstracts file is generated off-line and stored, that is, the only real-time execution activity required of the on-line system is an access to the file of stored "nearest" abstracts when a purchaser, for example, adds an item to the shopping basket. It is also clear that if a new document is entered into the system and made available to the purchaser, the system is scalable in that the abstract of the new document can be considered as a pseudo-object and the abstracts "nearest" the pseudo-object can serve as recommendations to the purchaser. There is no need to immediately rebuild the stored file for additional documents so that system rebuilds can be scheduled on an as-needed basis. Moreover, in yet another implementation, because of the pseudo-object capability, it may be possible to provide the purchaser with a list of documents "closest" to a set of keywords, and then for each one of the "closest" documents provide a set of recommended "nearest" documents.

The final processing step, as exhibited by processing block 760, is that of outputting to the purchaser the recommended list of "nearest" abstracts as an item is added to the shopping basket.

Generic Flow Processing (Generation and Storage of "Nearest" Items File)

Figure 8:
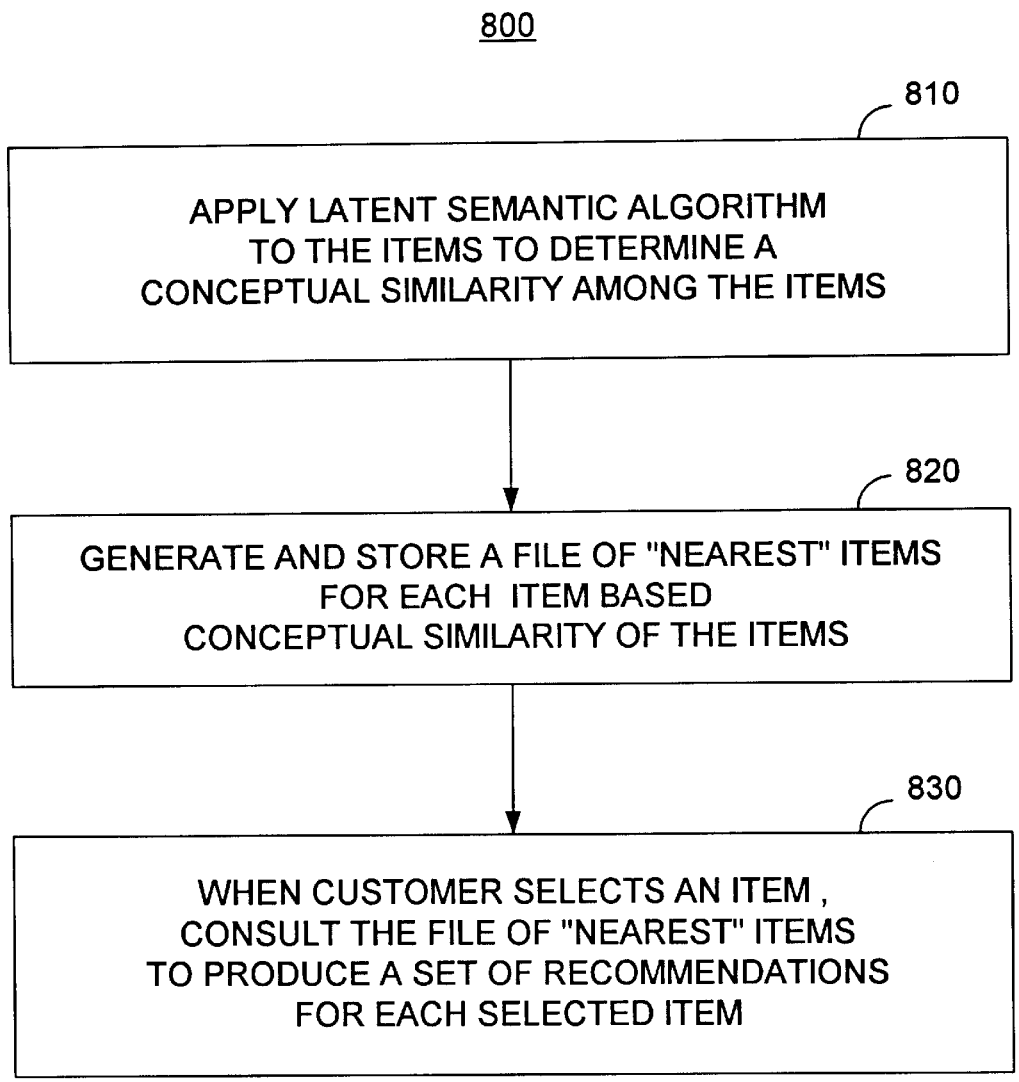
FIG. 8 is a flow diagram of the method of the present invention in its most generic form for generating and storing a "nearest" items file.

By way of abstracting the teachings and suggestions of FIGS. 5 and 7, flow diagram 800 of FIG. 8 depicts the most general processing in accordance with the method aspect of the present invention when a file of "nearest" items is generated, usually off-line, and then stored.

Processing block 810 applies a latent semantic algorithm to the items to determine a conceptual similarity among the items. It is implicit that the items form a catalog in the generic sense, and that each of the items has an associated textual description. Thus the catalog of items is not necessarily composed of documents, but can be composed of, as suggested earlier, audio tape listings, video tape listings, works-of-art, electronic product listings, and so forth; however, each item has an associated written description that can be used with a latent semantic algorithm to find the conceptual similarity among the items (e.g., inner product or dot product with the cosine measure).

Next, processing block 820 is invoked to find, for each item, the "nearest" items using the conceptual similarity as a measure of "nearness". The file is stored for later recall during the shopping experience of an on-line purchaser.

Finally, processing block 830 is executed so that, whenever each on-line purchaser adds a "latest" item to the shopping cart, the file of "nearest" items determined by processing block 820 is accessed to provide a recommendation of items "nearest" to the item added to the shopping cart. (Of course it is possible to return the "nearest" items to the purchaser at other points in the shopping experience, not just at the time the purchaser selects a "latest" items. For example, the "nearest" items for each item in the shopping basket could be displayed if there is sufficient screen display area to accomplish this display).

Generic Flow Processing (Dynamic Generation of "Nearest" Items File)

Figure 9:
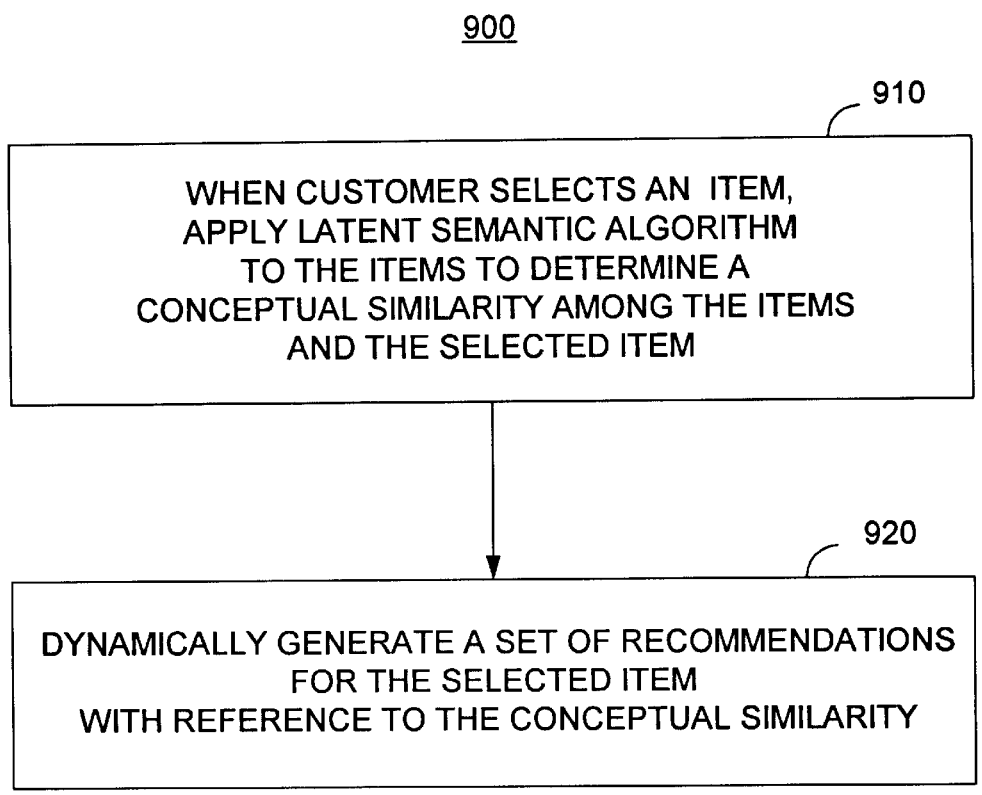
FIG. 9 is a flow diagram of the method of the present invention in its most generic form for generating a "nearest" items file useful for real-time and non real-time applications.

By way of abstracting the teachings and suggestions of FIGS. 5 and 7, flow diagram 900 of FIG. 9 depicts the most general processing in accordance with the method aspect of the present invention when a list of "nearest" items is dynamically generated in response to a purchaser's request—the processing by flow diagram 900 does not require storing a file of conceptual similarity among textual items.

Processing block 910 applies, whenever the on-line purchaser adds a "latest" item to the shopping cart, a latent semantic algorithm is applied to the items to determine a conceptual similarity among the items and the "latest" item. It is implicit that the items form a catalog in the generic sense, and that each of the items has an associated textual description. Illustratively, to carry out processing of block 910, the matrix $Y_R$ is computed off-line and stored; when a customer adds the "latest" item, this item is used as a pseudo-object to produce the nearest items based on the conceptual similarity between the "latest" item and all of the items.

Processing block 920 is then executed so that a recommendation of items "nearest" to the item added to the shopping cart is generated. (Of course it is possible to return the "nearest" items to the purchaser at other points in the shopping experience, not just at the time the purchaser selects a "latest" items. For example, the "nearest" items for each item in the shopping basket could be displayed if there is sufficient screen display area to accomplish this display).

System Hardware of An Illustrative Embodiment

Figure 10:
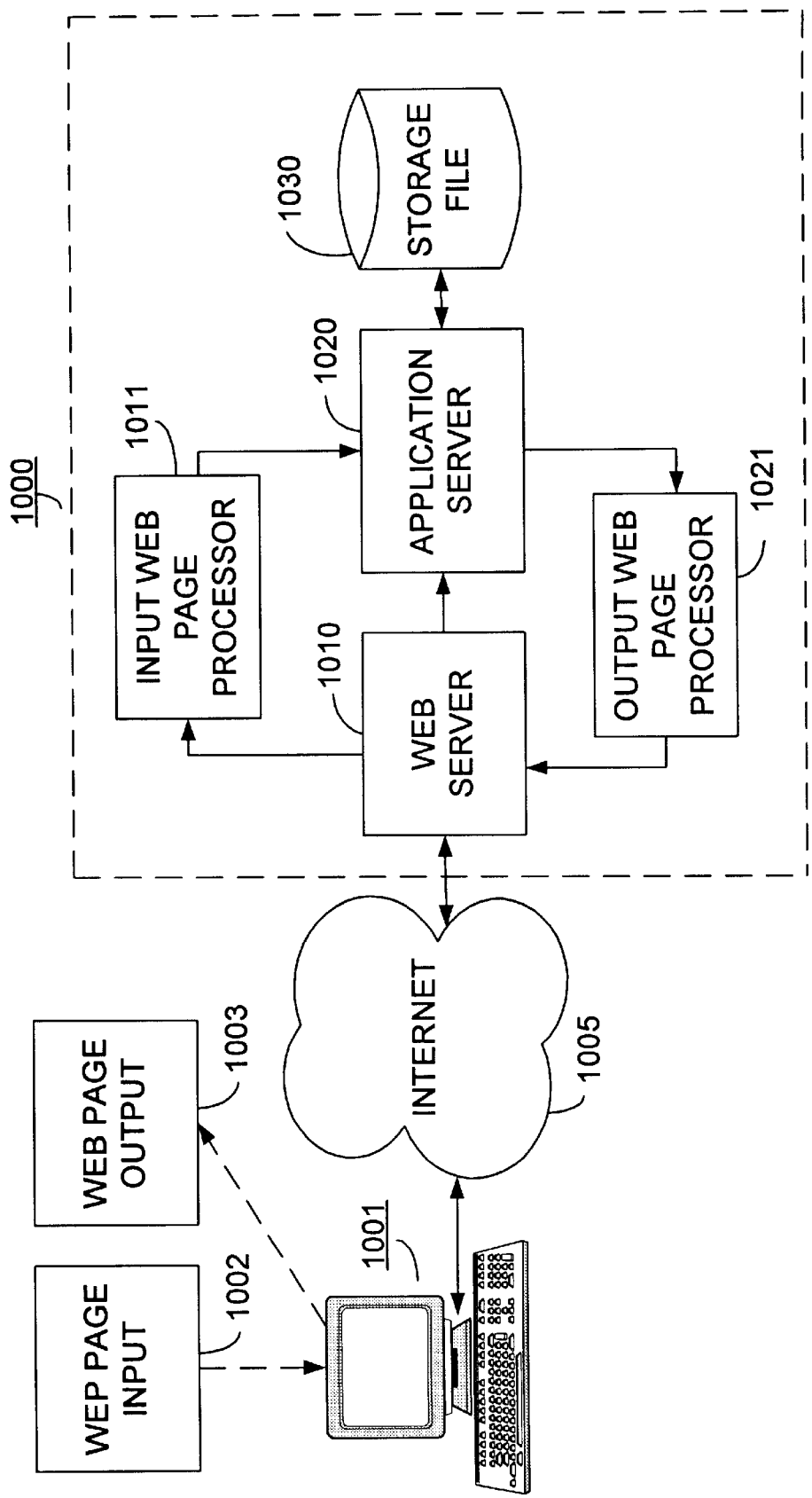
FIG. 10 is a high-level block diagram of hardware components for an illustrative embodiment of the present invention.

With reference to FIG. 10, there is shown high-level hardware diagram 1000 of components that comprise an illustrative embodiment of the system in accordance with the present invention. In particular, the components of system 1000 include: (a) Web server 1010; (b) application server 1020; and (c) storage file 1030. System 1000 is coupled to conventional Internet network or "cloud" 1005. Moreover, access to Internet 1005 by a customer is via PC 1001.

In operation, upon log-in and during various stages of the request-response interaction with system 1000, the purchaser is presented with a Web page in HTML format on the display of PC 1001—depicted as Web page 1002 which conveys purchaser input to system 1000, and as Web page 1003 which conveys a system response to the purchaser. When the purchaser requests information from system 1000 such as by typing and/or clicking on links on input Web page 1002, the request for information is transmitted using the "https" protocol to system 1000. In effect, the purchaser requests system responses in the usual manner by typing, pointing and/or clicking on HTML Web pages.

Web server 1010 passes the purchaser's input information, such as "search" keywords entered or a Web page link clicked upon by the purchaser, depending upon the stage of the shopping experience, to input web page processor 1011 which parses the Web page to obtain information to pass along to application server 1020. If the purchaser has entered "search" keywords, then application server 1020 consults storage file 1030 to obtain data to return a response Web page. Output Web page processor 1021 receives the response data, and prepares a Web page in HTML format for transmission, via server 1010 and Internet 1005, to PC 1001 as Web page 1003.

On the other hand, if the purchaser has clicked upon a item to add to the shopping basket, application server 1020 accesses that part of storage file 1030 that stores the file of "nearest" items to the clicked-upon item. The output of application server 1020 is a set of "nearest" items, which is again placed in HTML format and delivered to PC 1001, via Web server 1010 and Internet 1005, as response Web page 1003.

Generalizations to the System

For purposes of specificity, but not by way of limitation, system 1000 is illustrated as operating in the Internet environment with only a single server, and initially elucidates the set of services embodied in the product-purchase experience. However, it is equally clear that a general computer network implementation imbued with the structure and characteristics heretofore described can effect the applications in accordance with the present invention. For instance, the product-purchase experience can be implemented locally as well, that is, the client-server may be interconnected, for example, via a local area network (LAN) which is not coupled to the Internet. All of the aforementioned benefits apply to this local system so as to realize a product selection experience.

It is possible that additional filtering may be imposed so as to generate the recommendations provided to the purchaser; such filtering may be accomplished, illustratively, by processing blocks 830 or 920. For example, it may be plausible that items below a certain price may not warrant a recommendation, e.g., the price of the item placed in the basket. Also, the "nearest" items list could be filtered based on something known about the purchaser, e.g., no "adult" content for kids, or only content written in languages x and y but not language z. In addition, one might want to take into consideration other preferences known about the user and, for instance, change the ordering of items shown. This post-filer processing complements the pre-filtering processing already discussed.

In addition, it is possible to use multiple items as input to the latent semantic algorithm to generate a recommendation. To accomplish this, terms from each of the multiple items may be employed to generate a pseudo-object, that is, the pseudo-object is a composite of the terms in the multiple items. Accordingly, an extension to the illustrative embodiment is that of using all the items in the shopping basket or a subset of items in the shopping basket, in contrast to the latest item, to generate a recommendation. The technique for accommodating multiple items as input is normally implemented in real-time since it would be virtually impossible to generate and store a "nearest" items file using permutations of all items in the catalog to form composite pseudo-objects.

Finally, the recommended list could be e-mailed to the purchaser rather than displaying the list immediately on the screen. This may occur when, for example, the recommended list may be too large to be conveniently displayed on the screen display. Also, a recommendation could be e-mailed to the purchaser when a new item is added to the catalog and such added item, if available during the time of the prior interaction with the purchaser, would have been included in the list of recommended items. The e-mail functionality may be implemented by application server 1020.

Although various embodiments which incorporate the teachings of the present invention have been shown and described in detail herein, those skilled in the art can readily devise many other varied embodiments that still incorporate these teachings.

What is claimed is:

1. A method for automatically recommending textual items stored in a database to a user of a computer-implemented service, the user having selected one of the items, the method comprising the steps of filtering the textual items based upon pre-selected textual content, applying a latent semantic algorithm to the textual items to establish a conceptual similarity among the filtered textual items and the selected item, generating a first list of filtered items nearest to the selected item with reference to the conceptual similarity, filtering the first list of nearest items based upon predetermined criteria to produce a second list of filtered nearest items, and outputting to the user a recommended set of nearest items to the selected item created from a subset of the second list based upon the conceptual similarity.

2. The method as recited in claim 1 further including the step, prior to the step of applying, of forming a term-by-document matrix with reference to the textual items.

3. The method as recited in claim 2 wherein the step of applying includes the step of decomposing the term-by-document matrix into a reduced singular value representation.

4. The method as recited in claim 3 wherein the step of applying includes the step of generating a pseudo-object with reference to the selected item and the reduced singular value representation.

5. The method as recited in claim 4 wherein the step decomposing determines a distinct document matrix and the step of applying includes the step of examining a similarity between the pseudo-object and the document matrix to establish the conceptual similarity.

6. A method for automatically recommending textual items stored in a database to a user of a computer-implemented service, the method comprising the steps of filtering the textual items based upon pre-selected textual content, applying a latent semantic algorithm to the filtered textual items to establish a conceptual similarity among the textual items, generating a list of items nearest to each of the textual items with reference to the conceptual similarity, filtering the list of nearest items based upon predetermined criteria to produce a second list of filtered nearest items, and upon selection of one of the items by the user, outputting to the user a recommended set of nearest items to the selected item created from a subset of the second list based upon the conceptual similarity.

7. The method as recited in claim 6 further including the step, prior to the step of applying, of forming a term-by-document matrix with reference to the textual items.

8. The method as recited in claim 7 wherein the step of applying includes the steps of decomposing the term-by-document matrix into a reduced singular value representation and of storing the reduced singular value representation.

9. The method as recited in claim 8 wherein the step of applying includes the step of generating a pseudo-object with reference to the selected item and the reduced singular value representation.

10. The method as recited in claim 9 wherein the step decomposing determines a distinct document matrix and the step of applying includes the step of examining a similarity between the pseudo-object and the document matrix to establish the conceptual similarity.

11. A method for automatically recommending textual items stored in a database to a user of a computer-implemented service, the user having selected a plurality of items, the method comprising the steps of filtering the textual items based upon pre-selected textual content, applying a latent semantic algorithm to the filtered textual items with reference to the plurality of selected items to establish a conceptual similarity among the textual items and the selected items, generating a list of items nearest to each of the textual items with reference to the conceptual similarity, filtering the list of nearest items based upon predetermined criteria to produce a second list of filtered nearest items, and outputting to the user a recommended set of nearest items to the selected item created from a subset of the second list based upon the conceptual similarity.

12. The method as recited in claim 11 further including the step, prior to the step of applying, of forming a term-by-document matrix with reference to the textual items.

13. The method as recited in claim 12 wherein the step of applying includes the step of decomposing the term-by-document matrix into a reduced singular value representation.

14. The method as recited in claim 13 wherein the step of applying includes the step of generating a pseudo-object with reference to the selected items and the reduced singular value representation.

15. The method as recited in claim 14 wherein the step decomposing determines a distinct document matrix and the step of applying includes the step of examining a similarity between the pseudo-object and the document matrix to establish the conceptual similarity.

16. A method for automatically recommending items stored in a database to a user of a computer-implemented service, the method comprising the steps of generating a text-based description of each of the items, filtering the items based upon pre-selected textual content to produce filtered items, applying a latent semantic indexing algorithm to the filtered items to establish a conceptual similarity among the filtered items, generating a first list of filtered items nearest to the selected item with reference to the conceptual similarity among the filtered items, filtering the first list of nearest items based upon pre-determined criteria to produce a second list of filtered nearest items, and upon selection of one of the items by the user, outputting to the user a recommended set of filtered nearest items to the selected item by consulting the second list.

17. A method for on-line merchandising of textual items to a user over the Internet during an on-line session, the textual items being stored remotely in a database of an Internet application server, the user having selected one of the items, the method comprising the steps of filtering the textual items based upon pre-selected textual content, executing in the server a latent semantic algorithm on the filtered textual items to establish a conceptual similarity among the textual items and the selected item, generating a first list of filtered items nearest to the selected item with reference to the conceptual similarity, filtering the first list of nearest items based upon pre-determined criteria to produce a second list of filtered nearest items, and outputting to the user a recommended set of nearest items to the selected item created from a subset of the second list based upon the conceptual similarity.

18. The method as recited in claim 17 further including the steps of storing information in the server to contact the user at a later time, storing selections of textual items entered by the user in the database, whenever a new item is added to the database, re-executing the latent semantic algorithm on the textual items to establish a conceptual similarity among the textual items, including the new item, and the stored user selections, and informing the user about the new item whenever the conceptual similarity between the new item and stored selections is within a prescribed value with reference to the conceptual similarity.

* * * * *